Nov. 19, 1940.  W. S. GRAHAM ET AL  2,221,765
BEET PULLER
Filed March 18, 1939   3 Sheets-Sheet 1

Inventors
W.S.Graham
& F.E.Hand
By Paul O. Pippel
Atty.

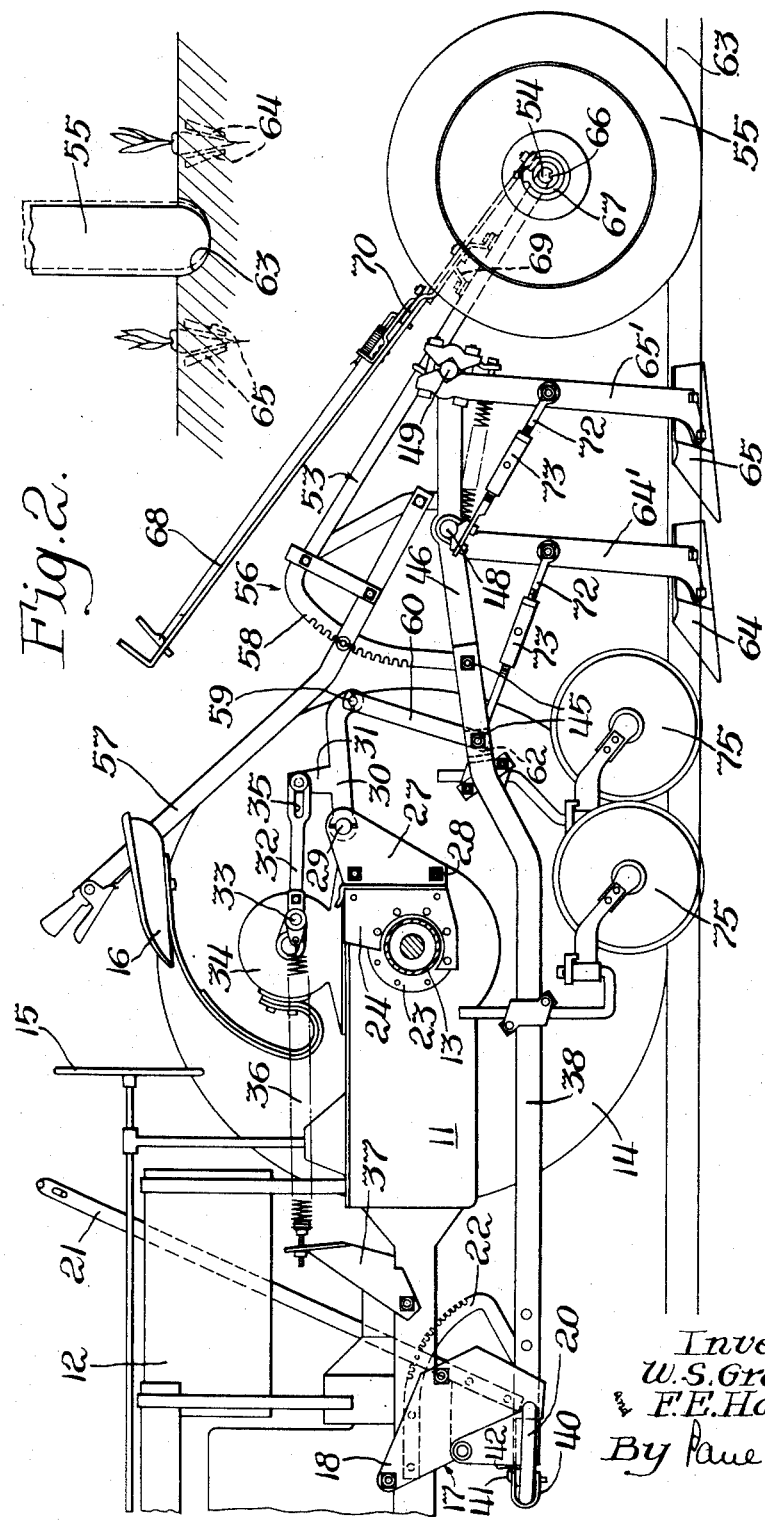

Nov. 19, 1940. W. S. GRAHAM ET AL 2,221,765
BEET PULLER
Filed March 18, 1939 3 Sheets-Sheet 3

Inventors
W. S. Graham
& F. E. Hand.
By Paul O. Pippel
Att'y.

Patented Nov. 19, 1940

2,221,765

UNITED STATES PATENT OFFICE 2,221,765

BEET PULLER

William S. Graham and Frederick E. Hand, Canton, Ill., assignors to International Harvester Company, a corporation of New Jersey Application March 18, 1939, Serial No. 262,772

16 Claims. (Cl. 55—196)

This invention relates to beet pullers and more particularly to a beet puller which is adapted to be transported by a tractor when not in operation.

The object of the invention is to provide a beet puller of a type having free lateral swinging movement when in its pulling position and a single supporting gauge wheel adapted to follow a previously formed trench to thereby guide the puller and its puller blades working on the beet rows.

It is another object of the invention to provide in a beet puller of the free lateral swinging type, means whereby the beet puller frame can be laterally adjusted relative to the wheel, which follows in a previously formed trench, the adjustment being according to the lateral spacing of the trench relative to the beet row.

It is another object of the invention to provide a beet puller of the type which, connected to the tractor, is adapted to extend forwardly under the rear axle structure of the tractor to loosely connect with a vertically adjustable hitch connection, the vertical hitch connection serving as an adjustment for the points of entrance of the puller blades.

In general, the puller frame consists of longitudinally extending side frames adapted to be connected forwardly of the rear axle structure to the hitch connection carried by the body portion of the tractor and to extend rearwardly, where the same is supported in its pulling position by a single supporting wheel, which is adapted to follow in a previously prepared trench running parallel to the beet rows and by which the lateral swinging movement of the puller frame is controlled. This supporting wheel also serves as a gauge means to control the working depth of the puller blades, and manual means is provided for making an adjustment of this gauge means to vary the working depth of the puller blades. Through the connections of the puller with the rear of the tractor, the puller is maintained level with respect to the ground and about the single supporting wheel. Not only may the puller frame be adjusted vertically with respect to the single supporting wheel, but also it may be adjusted laterally with respect to the supporting wheel to place the blades into true alinement with the beet rows according to the lateral spacing of the trench relative to a beet row.

The puller of the present invention has particular use in those sections of the country where beets are grown as a result of irrigation provided by the flowing of water over the same and through previously prepared trenches running parallel to the beet rows. In these sections of the country, the beet crops are planted in rows twenty to twenty-two inches apart, and there is provided a trench for the flow of water through the beet field in alternate spaces between rows. This trench is placed in the field by the usual irrigating shovel when planting, and is maintained by the same irrigating shovel during the cultivating operations. The trench remains in the field until the time for harvesting of the beets, whereupon it may be used as a guide for the beet puller of the present type. During the cultivating of these beets, it often happens that the trench is not left properly centered between the beet rows and may run closer to one row than to the other. It is to overcome this irregularity that there has been provided an adjustment for the lateral shifting of the puller frame with respect to the wheel adapted to run in the trench that controls the lateral movement of the puller.

For a better understanding of the features of the invention, reference may be had to the following detailed description taken in connection with the accompanying drawings, in which:

Figure 2 is an elevational view of that portion of the tractor and of the beet puller shown in Figure 1;

Figure 3 is a diagrammatic illustration of a section of the ground between beet rows which have a trench therebetween;

Figure 4:
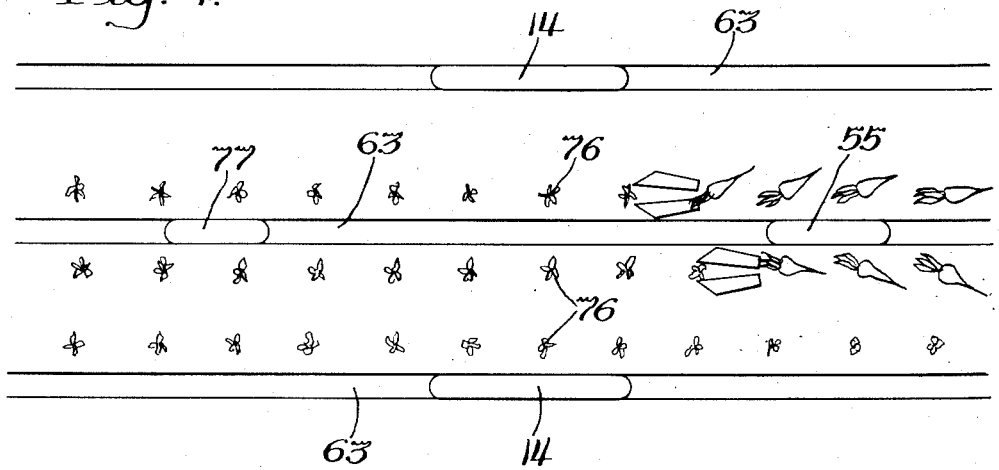
Figure 5:
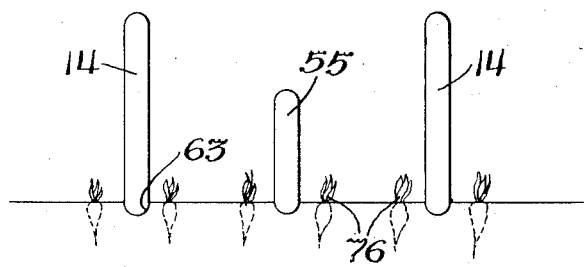

Figure 4 is another diagrammatic illustration, in plan, showing the arrangement of the irrigating trenches with reference to the beet rows as well as the travel of the tractor and of the beet puller with respect to the trenches and rows; and, Figure 5 is also a diagrammatic illustration similar to Figure 3, but including a vertical showing of the tractor wheels as well as of the ground supporting wheel.

Figure 1:
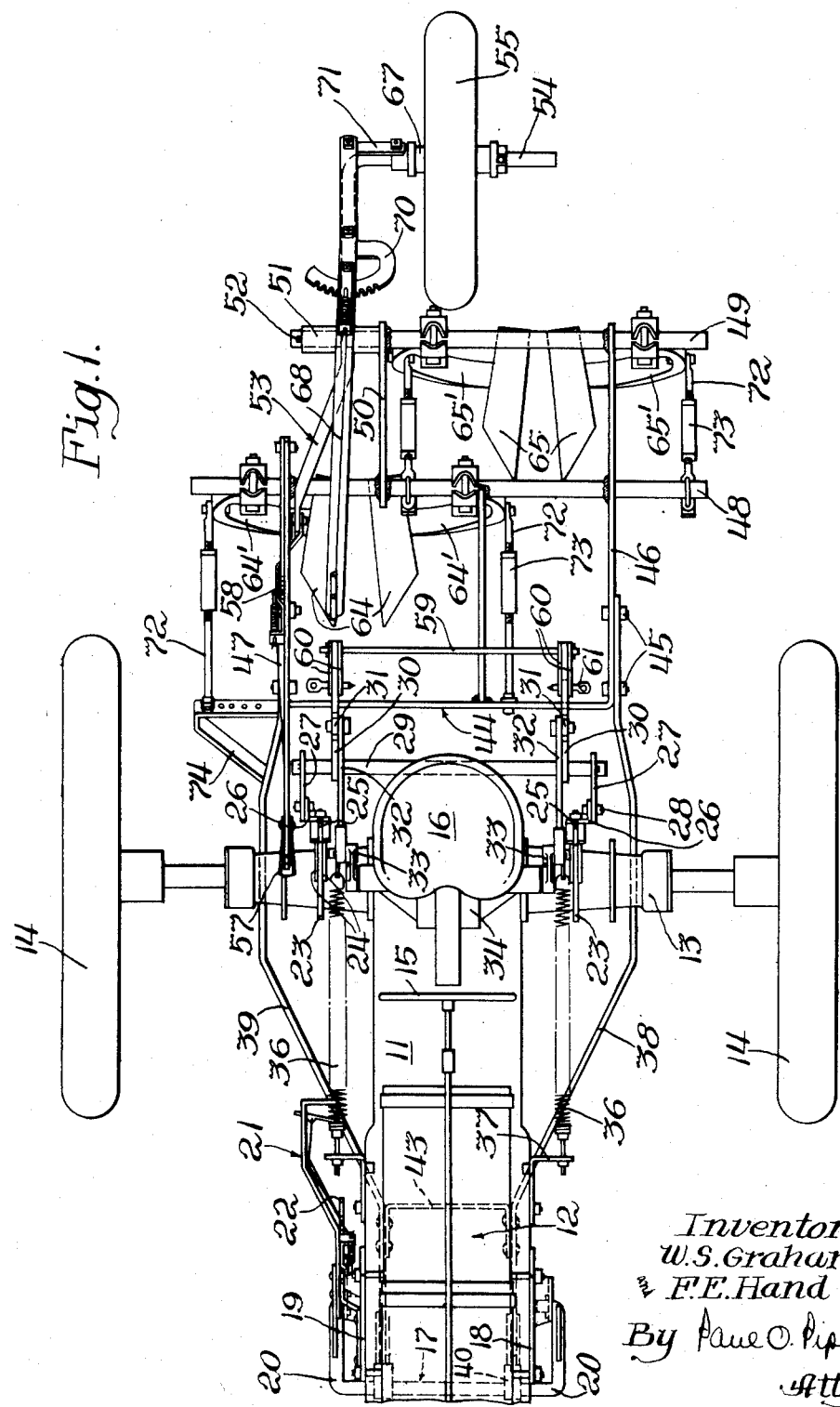
Figure 1 is a plan view of the rear portion of a tractor and of the beet puller of the present invention.

Referring now to Figures 1 and 2, there is shown a tractor designated generally at 11 having a body portion 12 including a rear axle structure 13, from which the rear wheels 14 are driven. The tractor also has the usual steering mechanism 15 and an operator's station 16. While only a portion of the tractor is shown, it should be understood that the steerable wheel which supports the forward end of the tractor is preferably of the single wheel type, such as shown in the illustration of Figure 4, in order that it may run in a trench, to rid the same of any irregularities which might tend to impair the function of the single supporting wheel of the beet puller.

Forwardly of the rear axle structure and connected to the body portion is a hitch connection means designated generally at 17. This hitch connection comprises two downwardly extending plates 18 and 19 at each side of the tractor. These plates serve as a pivotal support for a forwardly extending bail member 20. This bail member is connected to an adjusting lever 21 and adapted to be adjusted over a quadrant 22 to give vertical adjustment to the forward point or portion of the bail. The lever 21 and quadrant 22 are on the right hand side of the tractor and the lever extends to a location near to the operator's station 16. A movement of the lever toward the operator's station will effect raising of the forward point of the bail 20, while movement away from the operator's station will effect lowering of the forward portion of the bail 20. The adjustment of this lever affords a secondary means of controlling the depth of penetration of the puller blades. The lowering of the front end of the frame increases the penetration.

On the rear axle structure there are provided vertically extending attaching plates 23 to each of which is rigidly connected spaced plates 24 carrying the usual swing bolts 25, which fit in slots and over vertically extending attaching portions 26 having rearwardly and vertically extending brackets 27 fixed thereto by bolts 28. When the brackets 27 are so fixed, they become rigid with respect to the axle structure 13. There are two of these brackets 27 spaced on the rear axle structure and adapted to carry a transversely extending rock-shaft 29.

On the shaft 29 there are pivotally connected two spaced rearwardly extending lifting arms 30, each of which has vertically extending projections 31 for attachment to connecting links 32 with the crank arms 33 of a power lift device 34. The power lift device has two crank arms, one on each side, to which these connecting links 32 can attach. Each connecting link at its rear end has a slot 35 to permit lost motion of the connection of the link 32 with the vertically extending portion 31 of the lifting arms 30 when the lifting arms are in a lowered position. To assist the operation of the power lift device 34 there is provided a helper spring 36 connected to the crank arm 33 at one end and adjustably fixed at its other end to a vertically extending bracket 37 rigidly connected with the body portion 12 of the tractor.

The puller comprises a frame made up generally of longitudinally extending side frame members 38 and 39, which converge forwardly for their connection with the forward portion of the bail 20. Their connection with the bail consists of a U-member 40, Figure 1, surrounding the forward portion of the bail 20 and adapted to carry a pull pin 41, by means of which the eye portions 42 of the forward ends of the side members may be connected to the U-member 40. This mode of connection is usual and gives to the puller frame a certain amount of freedom of movement in vertical and lateral directions. A transverse spacer bar 43, located at the forward ends of the side frames, retains the same in spaced relation.

The rear ends of the side frames are retained in spaced relation by a transverse frame 44 connected to the rear ends of the side frames 38 and 39 by means of bolts 45 and which in itself has longitudinally extending portions 46 and 47. The transverse frame 44 in turn carries two transversely extending shafts 48 and 49, the latter being spaced rearwardly of the former. The portion 47 of the transverse rfame 44 is shorter in length than the portion 46 thus, in order to provide a support for the right hand portion of the shaft 49, there is welded between the shafts 48 and 49 a frame member 50. The shaft 49 extends to the right side of the puller a sufficient distance to receive a sleeve 51 loosely fitted on the shaft 49 and retained there by a cotter pin 52. This sleeve has rigidly connected to it a longitudinally extending wheel-carrying means 53, the rear portion of which extends laterally, as at 54, to permit the mounting of a ground supporting or gauge wheel 55. An adjusting means 56, including a lever 57 and quadrant 58, is connected with the forward end of the longitudinally extending means 53, whereby this means 53 may be moved or adjusted vertically with the sleeve about the shaft 49 to adjust the puller frame with respect to the supporting wheel 55 and about the hitch connection 17. The rearward ends of each of the lifting arms 30 carry a shaft 59, which forms means for loosely carrying two downwardly extending pairs of links 60, the lower ends of which are pivotally and loosely connected by means of pins 61 to rearwardly extending projections 62 on the transverse frame 44. The connections of these links at both their upper and lower ends have sufficient looseness to permit lateral swinging of the puller frame with respect to the tractor, and, when the puller frame is in its pulling position as in Figure 2, by means of the slot 35, the puller frame may have considerable free floating movement with respect to the links 32 connected with the power lift device 34. It should thus be seen that with a previously formed trench in the ground, lateral movement of the machine will be guided by the supporting wheel 55 adapted to run in trenches 63 shown particularly in the illustrations of Figures 3, 4 and 5. Further, it should be seen that by connection with the arms 32 at each side of the tractor, any tilting movement of the machine during the pulling operation will be stabilized through the transverse rock-shaft 29 to which the arms are rigidly connected. Through this means the machine will be maintained level with respect to the ground and about the single supporting wheel.

Normally under best cultivating conditions, the trenches are centrally spaced accurately between spaced rows of beets, as shown in Figures 4 and 5, the trenches being placed in the beet field at every two rows, but, as above explained, it so often happens that, due to the cultivating operation and the reforming of an irrigating trench 63, the same is apt to have a spacing such as shown in dotted lines in Figure 3 and nearer to one beet row than to the other. Such a spacing would cause puller blades 64 and 65 to be out of definite alinement with the beet rows which would thereby result in destruction or cutting off of the beets.

The portion 54 of the longitudinally extending means 53 has a key-way 66, as shown in Figure 2, adapted to retain a sleeve 67 on which the wheel 55 may revolve. The sleeve, being held against rotative movement by this key-way 66, can thereby be adjusted transversely to effect lateral adjustment of the puller with respect to the wheel 55. This is effected through a manually adjusting lever 68 pivoted to be adjusted transversely on a bracket 69 carried on the lower end of the longitudinally extending means 53. This bracket 69 also carries a quadrant 70 about which the lever 68 is adjustable. The lower end of the lever 68 is connected through a link 71 with the sleeve 67, by which movement of the puller frame according to the spacing of the trench 63 with respect to the beet rows can be effected.

The beet puller blades are in pairs and the pair 64 is connected with the transverse shaft 48, while the pair 65 is connected with the transverse shaft 49. The attachment of these puller blades is effected through their respective standards 64' and 65', which have their upper ends taking the form of a clamp, whereby fore and aft alinement of the blades of each pair may be accomplished. Each standard has a pull strap 72 connnected to it, which in turn is connected to the frame forwardly of the standard, and these pull straps each have turnbuckles 73 for effecting slight adjustment of tilt and definitely fixing the position of the standard and adjustment of the points of entrances of the blades. In order to provide a connection point of the strap for the outer right hand blade 64, there is provided a laterally extending projection 74 on the puller frame. The puller frame also carries coulter wheels 75 adapted to travel forwardly of the blades and to cut off the beet tops which may have drooped down into the space between the beet rows.

Referring now to Figures 4 and 5, there are shown a plurality of beet rows 76 and three irrigation trenches 63. The beet puller of the present invention is adapted to operate on two beet rows at a time. The particular beet rows which are operated on are those between which there is provided an irrigation trench. A steering wheel 77 of the tractor will be alined with the irrigating trench by the operator and the single supporting wheel 55 will normally follow in longitudinal alinement with the steering wheel 77. The irrigating trenches being spaced every two rows, the tractor wheels 14 can be spaced on the tractor and with relation to and including the steering wheel 77 so that they may each run in an irrigation trench 63. These Figures 4 and 5 show the arrangement of the machine when the trenches have been properly centrally spaced with respect to the beet rows. Should the trench be closer to one of the beet rows than to the other, lateral adjustment of the frame may be made by means of the lever 68, which is accessible from the operator's station 16. The lever 68 being so accessible, the adjustment may be made while the tractor and puller are progressing along the field, although this is often unnecessary, since the relationship of the trench with a beet row is carried throughout the length of the field and hence the adjustment need be made only at the time of entrance into the field for a given crossing of the same. By having the wheel 77 arranged to follow ahead of the supporting wheel 55 and by having the rear tractor wheels 14 adapted to travel in the trenches, these trenches are free from irregularities which would otherwise affect the controlling movement of the supporting wheel 55.

While various changes may suggest themselves as to the details of construction of the puller, it shall be understood that such changes shall be within the spirit and scope of the present invention as defined by the appended claims.

What is claimed is:

1. In a beet puller, a puller frame having puller blades thereon, a single supporting wheel for the frame adapted to follow in a previously prepared trench running parallel to beet rows to control the movement of the frame and blades during the pulling operation, and manual means capable of laterally adjusting the frame and blades with respect to the supporting wheel during the pulling operation to shift the same according to the lateral spacing of the trench relative to a beet row.

2. In a beet puller, a puller frame having puller blades alined to be operative on beet rows, gauge means for supporting the frame and blades and adapted to follow a previously prepared trench in the ground running parallel to the beet rows to control the lateral movement of the frame and blades during the pulling operation, and manual means capable of laterally adjusting the frame and blades with respect to the gauge means during the pulling operation to shift the same according to the lateral spacing of the trench relative to a beet row.

3. In combination, a tractor, a beet puller frame connected to the tractor for free vertical and lateral movement while in its pulling position, puller blades carried by the frame, a ground supporting wheel for the puller adapted to follow a previously prepared trench in the ground parallel to the beet rows and to maintain the lateral alinement of the puller blades with respect to the beet rows during the pulling operation, and manual means capable of laterally adjusting the frame and blades during the pulling operation to shift the same with respect to the supporting wheel according to the lateral spacing of the trench with relation to a beet row.

4. In combination, a tractor, a beet puller frame connected to the tractor to be pulled thereby, the connection being such as to allow free lateral swinging movement of the puller during the pulling operation, a single ground supporting wheel for the puller frame adapted to follow in a trench between the beet rows to control the path of movement of the beet puller, and manual means capable of laterally adjusting the frame during the pulling operation to shift the same with respect to the supporting wheel according to the lateral spacing of the trench with relation to the beet rows.

5. In combination, a tractor, a beet puller frame loosely connected to the tractor and adapted to have lateral swinging movement in its pulling position and having puller blades alined to be operative on a beet row, a single ground-supporting wheel for the frame adapted to follow a trench in the ground to control the lateral swinging movement of the frame during the pulling operation, means for vertically adjusting the frame with respect to the supporting wheel to vary the pulling depth of the blades, and manual means capable of laterally adjusting the frame with respect to the supporting wheel during the pulling operation to shift the same according to the lateral spacing of the trench relative to the beet rows, whereby said supporting wheel serves as means from which the frame may be adjusted laterally as well as vertically to vary the pulling depth of the blades.

6. In combination, a tractor, a beet puller frame loosely connected to the tractor and adapted to have lateral swinging movement in its pulling position and having puller blades alined to be operative on a beet row, gauge means for supporting the frame in the pulling position and adapted to follow a previously prepared trench in the ground running parallel to the beet row whereby the lateral swinging movement of the frame is controlled during the pulling operation, and manual means capable of laterally adjusting the frame and blade with respect to the gauge means during the pulling operation to shift the same according to the lateral spacing of the trench relative to the beet row.

7. In combination, a tractor having a body portion, a beet puller connected to the tractor for free lateral movement with respect thereto in its pulling position and adapted to normally follow the tractor in longitudinal alinement with the body portion thereof, said puller comprising a frame, puller blades carried by the frame, ground supporting means for the frame tending to follow in definite longitudinal alinement with the body portion of the tractor but deviating laterally when caused to do so by the ground, and manually adjustable means capable of laterally shifting the frame and blades with respect to the supporting means during the pulling operation and out of its normal longitudinal alinement with the body portion of the tractor.

8. In combination, a tractor having a body portion and a rear axle, a beet puller frame having puller blades, means for connecting the frame for pivotal movement to the body portion of the tractor forwardly of the rear axle, a power lift device on the tractor, means for connecting the puller frame with the power lift device to be lifted to a transport position, all of said connecting means being such as to allow vertical and lateral movement of the puller frame with respect to the tractor when in its pulling position, a ground supporting wheel for the puller frame adapted to follow a previously prepared trench in the ground to maintain the lateral alinement of the puller blades with respect to beet rows during the pulling operation, and manual means capable of laterally adjusting the frame and during the pulling operation to shift the same with respect to the supporting wheel according to the spacing of the trench with relation to a beet row.

9. In combination, a tractor having a body portion and a single steerable wheel, a beet puller frame connected to the tractor for free lateral movement during the pulling operation, puller blades on the frame alined to be operative on beet rows, said tractor arranged with relation to the beet rows to have its steerable wheel travel in a trench running parallel to the beet rows to render the same void of slight irregularities therein, a single ground supporting wheel for the frame tending to follow in the trench directly behind the steerable wheel of the tractor to control the lateral movement of the frame and blades with respect to the beet rows, and means for laterally adjusting the frame and blades out of their normal longitudinal alinement with the tractor and according to the lateral spacing of the trench with relation to a beet row.

10. In combination, a tractor, a beet puller loosely connected at one location on the tractor to be pulled thereby, power lift device means on the tractor to lift the puller about the one location to a transport position, connection means between the power lift device and the puller to permit free floating and lateral movement when the puller is in its pulling position, ground supporting means for the puller adapted for following a previously formed trench in the ground running parallel to beet rows to control the lateral movement of the puller during the pulling operation, and means capable of laterally adjusting the puller with respect to the supporting means during the pulling operation according to the lateral spacing of the trench relative to a beet row.

11. In combination, a tractor, a beet puller loosely connected at one location on the tractor to be pulled thereby, power lift device on the tractor to lift the puller about the one location to a transport position, connection means between the power lift device and the puller to permit free floating and lateral movement when the puller is in its pulling position, longitudinally extending means pivoted on the puller to be adjusted in a vertical plane, a ground supporting wheel carried by the rearward end of said longitudinal means and adapted to follow a previously formed trench running parallel to beet rows to control the lateral movement of the puller during the pulling operation, the rearward end of said means extending laterally sufficiently to permit lateral adjustment of the puller and means relative to the wheel, and manual adjusting means on the longitudinally extending means to laterally adjust the puller according to the lateral spacing of the trench with relation to a beet row.

12. In combination, a tractor having a body portion including a rear axle structure, a vertically adjustable hitch connection on the body portion forward of the rear axle structure, a beet puller loosely connected to the adjustable hitch connection and having puller blades thereon, a power lift device to lift the puller about the hitch to a transport position, connection means between the power lift device and the puller adapted to permit floating and lateral movement of the puller in its pulling position, a single supporting wheel for the puller adapted to follow in a trench running parallel to the beet rows, means for vertically adjusting the puller with respect to said supporting wheel and about the hitch connection to vary the pulling depth of the puller blades, said hitch connection serving to effect adjustment of the points of entrance of said blades by adjustment of the puller about the supporting wheel, and means for laterally adjusting the puller with respect to the supporting wheel according to the lateral spacing of the trench relative to a beet row.

13. In combination, a tractor, a beet puller loosely connected to the tractor at locations thereon for free vertical and lateral movement when in its pulling position, a single means for supporting the puller in pulling position, the connection of the puller with the tractor at one location thereon being such as to stabilize and maintain the level of the puller during the pulling operation and at the same time allowing for positive lateral adjustment of the puller with respect to the single supporting means.

14. In combination, a tractor having a rear axle, a beet puller with puller blades having its forward portion loosely and adjustably connected to the tractor ahead of the rear axle and the rearward portion extending rearwardly of the tractor, gauge means for supporting and controlling the depth of penetration of the puller blades located on the rearward portion of the puller, and manual adjusting levers for respectively effecting the adjustment of the forward portion of the puller and of the gauge means, whereby the penetrating depth of the puller blades is cooperatively controlled by the tractor and by the gauge means of the puller.

15. In combination, a tractor, a beet puller frame having forward and rearward portions, puller blades carried by the frame, said frame having its forward portion loosely and adjustably connected to the tractor, gauge means for supporting and controlling the depth of penetration of the puller blades located on the rearward portion of the puller frame, and manual adjusting levers for respectively effecting the adjustment of the forward portion of the puller frame and of the gauge means, whereby the penetrating depth of the puller blades is cooperatively controlled by the tractor and by the gauge means.

16. In combination, a tractor, a two-row beet puller frame having forward and rearward portions, two laterally spaced pairs of puller blades carried by the frame, said frame having its forward portion loosely and adjustably connected to the tractor, gauge means for controlling the depth of penetration of the puller blades centrally disposed with respect to the laterally spaced pairs of puller blades and located on the rearward portion of the frame, and manual means for respectively adjusting the forward portion of the puller frame and of the gauge means, whereby the penetrating depth of the puller blades is cooperatively controlled by the tractor and by the gauge means.

WILLIAM S. GRAHAM.
FREDERICK E. HAND.

CERTIFICATE OF CORRECTION.

Patent No. 2,221,765.　　　　　　　　　　　　　　　　　November 19, 1940.

WILLIAM S. GRAHAM, ET AL.

It is hereby certified that error appears in the printed specification of the above numbered patent requiring correction as follows: Page 4, first column, line 37, claim 8, before the word "during" insert --blades--; and that the said Letters Patent should be read with this correction therein that the same may conform to the record of the case in the Patent Office.

Signed and sealed this 31st day of December, A. D. 1940.

(Seal)　　　　　　　　　　　　　　　　　　　　　　　Henry Van Arsdale,
　　　　　　　　　　　　　　　　　　　　　　　　　Acting Commissioner of Patents.